(12) United States Patent
Preisler

(10) Patent No.: US 11,456,505 B2
(45) Date of Patent: Sep. 27, 2022

(54) HOUSING FOR RECEIVING AT LEAST ONE BATTERY CELL PACK, BATTERY, AND METHOD FOR PRODUCING A HOUSING AND A BATTERY

(71) Applicant: Vitesco Technologies GMBH, Hannover (DE)

(72) Inventor: Stefan Preisler, Pentling (DE)

(73) Assignee: Vitesco Technologies GmbH, Regensberg (DE)

( * ) Notice: Subject to any disclaimer, the term of this patent is extended or adjusted under 35 U.S.C. 154(b) by 208 days.

(21) Appl. No.: 16/888,000

(22) Filed: May 29, 2020

(65) Prior Publication Data
US 2020/0303698 A1 Sep. 24, 2020

Related U.S. Application Data

(63) Continuation of application No. PCT/EP2018/082372, filed on Nov. 23, 2018.

(30) Foreign Application Priority Data

Nov. 30, 2017 (DE) ..................... 10 2017 221 508.9

(51) Int. Cl.
| H01M 50/20 | (2021.01) |
| H01M 10/42 | (2006.01) |
| H01M 10/48 | (2006.01) |
| H01M 50/227 | (2021.01) |
| H01M 50/289 | (2021.01) |
| H01M 50/249 | (2021.01) |
| G02B 6/42 | (2006.01) |

(52) U.S. Cl.
CPC ........ *H01M 50/20* (2021.01); *H01M 10/425* (2013.01); *H01M 10/488* (2013.01); *H01M 50/227* (2021.01); *H01M 50/289* (2021.01); *G02B 6/4201* (2013.01); *H01M 50/249* (2021.01); *H01M 2010/4271* (2013.01); *H01M 2010/4278* (2013.01); *H01M 2220/20* (2013.01)

(58) Field of Classification Search
None
See application file for complete search history.

(56) References Cited

U.S. PATENT DOCUMENTS

| 9,553,459 B2 | 1/2017 | Mack |
| 9,553,465 B2 | 1/2017 | Raghavan et al. |
| 9,570,781 B2 | 2/2017 | Saunders et al. |

(Continued)

FOREIGN PATENT DOCUMENTS

| CN | 201789043 U | 4/2011 |
| CN | 106415878 A | 2/2017 |

(Continued)

OTHER PUBLICATIONS

International Search Report and Written Opinion dated Feb. 19, 2019 from corresponding International Patent Application No. PCT/EP2018/082372.

(Continued)

*Primary Examiner* — Jonathan Crepeau

(57) ABSTRACT

A housing for receiving at least one battery cell pack, having at least one housing wall, wherein the housing wall is formed at least partially from a plastic, and an optical conductor is formed in the plastic of the housing wall.

17 Claims, 1 Drawing Sheet

(56) References Cited

U.S. PATENT DOCUMENTS

| | | | | |
|---|---|---|---|---|
| 2015/0303527 A1* | 10/2015 | Maxwell | ............. | H01M 10/482 |
| | | | | 429/61 |
| 2016/0064703 A1 | 3/2016 | Mack et al. | | |
| 2016/0365611 A1* | 12/2016 | Yao | ........................ | G01L 1/243 |
| 2017/0025655 A1* | 1/2017 | Klimek | .................... | B60K 1/04 |
| 2018/0109328 A1 | 4/2018 | Eberhard et al. | | |
| 2018/0248233 A1* | 8/2018 | Schade | ............... | H01M 10/482 |

FOREIGN PATENT DOCUMENTS

| | | |
|---|---|---|
| CN | 106531920 A | 3/2017 |
| DE | 102012202751 A1 | 8/2013 |
| DE | 102015202339 A1 | 8/2016 |
| DE | 102014219720 | 9/2018 |
| DE | 102017204138 A1 | 9/2018 |

OTHER PUBLICATIONS

German Office Action dated Oct. 19, 2018 for corresponding German Patent Application No. 10 2017 221 508.9.
Chinese Office Action dated Feb. 23, 2022 for corresponding Chinese patent application No. 201880077610.8.

* cited by examiner

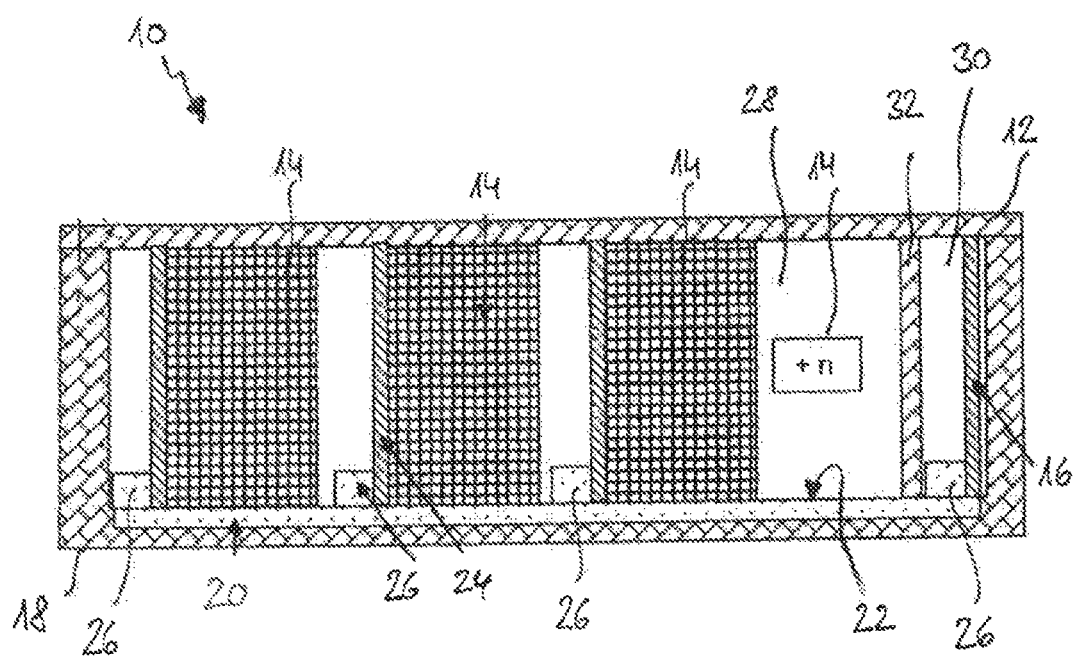

HOUSING FOR RECEIVING AT LEAST ONE BATTERY CELL PACK, BATTERY, AND METHOD FOR PRODUCING A HOUSING AND A BATTERY

CROSS-REFERENCE TO RELATED APPLICATIONS

This application claims priority to PCT Application PCT/EP2018/082372, filed Nov. 23, 2018, which claims priority to German Patent Application No. DE 10 2017 221 508.9, filed Nov. 30, 2017. The disclosures of the above applications are incorporated herein by reference.

FIELD OF THE INVENTION

The invention relates to a housing, such as a battery housing, for receiving at least one battery cell pack. Moreover, the invention relates to a battery having at least one battery cell pack, and to a housing surrounding the battery cell pack. Furthermore, the invention relates to a method for producing a housing and to a method for producing a battery.

BACKGROUND OF THE INVENTION

Housings, such as battery housings, are widely known. The known battery housings are designed to receive and enclose battery cell packs. It is furthermore known that the housing wall may be used as a transmission medium. Thus, DE 10 2012 202 751 A1, for example, describes a battery sensor data transmission unit in which a data transmission unit is formed in order to output to an evaluation unit a sensor signal that represents a physical variable in or at the battery cell, using a battery housing wall and/or a wall of a battery cell as a transmission medium. In this context, it is envisaged that the housing is of electrically conductive design, thus enabling data, such as those in the sensor signal, to be transmitted via the electrically conductive housing wall. Owing to their electrically conductive materials, electrically conductive housings of this kind are expensive to produce and may have a high weight.

SUMMARY OF THE INVENTION

It is the object of the present invention to provide a housing, such as a battery housing, and a battery which is produced economically and/or has a reduced weight. It is furthermore the object of the invention to specify a method for producing a housing, such as a battery housing, and a battery, by which the production costs and/or the weight of the housing or the battery is reduced.

The objects are achieved by the subjects of the independent patent claims. Advantageous refinements of the invention are specified in the dependent claims, the description and the FIGURE, wherein each feature may constitute an aspect of the invention both individually and in combination. Here, all combinations as well as isolated combinations between the features of the housing, of the battery and of the methods for producing the housing and/or the battery may be utilized together. It is furthermore in each case also envisaged and possible for individual or a plurality of features of the housing, of the battery and/or of the method for producing the housing and/or the battery to be combined in any desired manner.

According to the invention, a housing for receiving at least one battery cell pack is provided, having at least one housing wall, wherein the housing wall is formed at least partially from a plastic, and an optical conductor is formed in the plastic of the housing wall.

In other words, a housing having at least one housing wall is provided, wherein the housing wall is formed at least partially from a plastic. By forming at least a partial region of the housing or of the housing wall from a plastic, it is possible to reduce the weight of the housing, such as of a battery housing. An optical conductor is formed in the partial region of the housing or of the housing wall which is produced from plastic and/or includes a plastic. The optical conductor is therefore formed integrally with the housing and/or with the housing wall. Consequently, the optical conductor is formed immovably in the housing or the housing wall. An optical conductor is also referred to as an optical waveguide. In this way, there is the preferred possibility of transferring data and/or signals, especially physical data and/or signals, via the optical conductor formed in the housing wall. The housing wall or at least the partial region of the housing wall which has the optical conductor may thus be used as a data transmission section.

In principle, it may be sufficient for only a partial region of the housing wall to include a plastic. One advantageous development of the invention consists in forming the housing entirely from a plastic. In this way, it is possible to reduce the weight of the housing. Moreover, a housing of this kind may preferably be produced in an injection molding process, thereby making it possible to reduce production costs. Another advantage of a housing produced entirely from a plastic may be that the optical conductor may thus be formed retrospectively at any desired location. Moreover, the housing which is formed entirely and/or predominantly from a plastic provides reliable galvanic isolation of the battery cell packs arranged therein.

The housing or housing wall is preferably designed to receive and/or enclose various components, preferably one or more battery cell packs for storing electric energy. One advantageous development of the invention consists in the housing wall having at least one fastening device for fastening at least one battery cell pack. In this way, the battery cell pack may be arranged securely in position in the housing with the aid of the fastening device. Secure positioning of the battery cell pack in the housing is provided in order preferably to connect and/or couple an optical interface of the battery cell pack to the optical conductor in such a way that the at least one battery cell pack is connected to the optical conductor in terms of communication.

In principle, the fastening device is configured in any desired manner to fasten the battery cell pack in the housing and fix it in position. One preferred development of the invention consists in that the fastening device is a clamping device and/or a screw-action device. Using a clamping device, a battery cell pack may be fastened in a simple manner, preferably in a self-adjusting manner. Self-adjusting means that the clamping device is of resilient design, for example, and exerts a contact pressure on the battery cell pack arranged in the battery housing. The contact pressure is preferably oriented in such a way that an optical interface of the battery cell pack is pressed against the optical conductor formed in the housing wall. The screw-action device may be an internal thread for receiving a screw having a corresponding external thread, for example. It is likewise conceivable for the screw-action device to have an external thread for receiving a nut with a corresponding internal thread.

In principle, provision may be made for the housing to have just one chamber. One preferred development of the invention consists in that the housing has at least two mutually separate chambers, wherein the optical conductor formed in the housing wall connects the two chambers to one another in terms of communication. This includes that at least one partition, for example, is formed in the housing, thus enabling at least two mutually separate chambers to be formed in the housing. In this way, it is possible, for example, to arrange a battery cell pack in the first chamber, and a battery electronics system, such as a battery management system BMS, is arranged in the second chamber. Here, the optical conductor is formed in the housing wall in such a way that the two chambers are connected via the optical conductor. A simple and inexpensive data and/or signal transmission section is thus formed between the two chambers.

One advantageous development of the invention consists in that the chambers are formed in such a way as to be separated from one another in a manner impermeable to gas and/or liquid. This is accomplished, for example, by attaching the partition to the housing wall in a fluidtight manner. The fluidtight attachment of the partition is accomplished by welding and/or adhesive bonding, for example. It is likewise conceivable for the partition to be formed integrally with the housing wall, and to be produced in a single production process with the housing wall. Thus, the chambers separated from one another in a fluidtight manner are connected to one another in terms of communication via the optical conductor formed and/or arranged in the housing wall.

In a preferred development of the invention, it is envisaged that the housing is a battery housing, and at least one battery cell pack is arranged in the battery housing, and the battery cell pack is connected in terms of communication to the optical conductor formed in the housing wall.

The invention furthermore relates to a battery, having at least one battery cell pack having an optical interface, a battery electronics system having an optical interface, and a housing, which surrounds the at least one battery cell pack and the battery electronics system and has at least one housing wall, wherein the at least one housing wall is formed at least partially from a plastic, and an optical conductor is formed in the plastic, wherein the at least one battery cell pack and the battery electronics system are arranged in the battery housing in such a way that the respective optical interface thereof is connected in terms of communication to the optical conductor formed in the housing wall.

In other words, a battery which has at least one battery cell pack, preferably a plurality of battery cell packs, is specified. The battery cell pack has at least one optical interface. A battery electronics system, which likewise has an optical interface, is furthermore provided. The battery electronics system is preferably a battery management system BMS. Both the battery cell pack and the battery electronics system are enclosed by a housing having at least one housing wall, wherein the housing wall is formed and/or produced at least partially from a plastic. An optical conductor is formed in the plastic. The respective optical interface of the battery cell packs and of the battery electronics system is connected to the optical conductor. In this way, the battery cell pack and the battery electronics system may be connected to one another in terms of communication via the optical conductor formed in the housing. By way of example, information and/or signals relating to the temperature and/or the state of charge of the battery cell pack is transmitted to the battery electronics system via the optical conductor. Wired cabling between the at least one battery cell pack and the battery electronics system is reduced and/or avoided, thereby making it possible to save on electromechanical components such as plug connectors and/or transformers, for example. It is thus possible to reduce the production costs for the battery.

One advantageous development of the invention consists in that the housing wall has at least one fastening device for fastening the at least one battery cell pack and/or the battery electronics system, and the battery cell pack and/or the battery electronics system include/includes appropriately corresponding fastening means. In this way, the battery cell pack and/or the battery electronics system is fastened and/or positioned in a secure position in the housing.

In principle, the fastening device and the corresponding fastening means are configured in any desired manner to fasten the battery cell pack in the housing and fix it in position. One preferred development of the invention consists in that the fastening device is a clamping device and the fastening means is a device for latching in behind, which is brought into engagement with the clamping device, or the fastening device is a screw-action device and the fastening means is a screw element, which is brought into engagement with the screw-action device.

By using a clamping device, the battery cell pack is fastened in a simple manner, preferably in a self-adjusting manner. The screw-action device may be an internal thread for receiving a screw having a corresponding external thread, for example. It is likewise conceivable for the screw-action device to have an external thread for receiving a nut with a corresponding internal thread. Fastening means and appropriately corresponding fastening devices, by way of which the battery cell pack and/or the battery electronics system are arranged and/or fastened in a simple manner in the housing, are thereby specified.

In one advantageous development of the invention, it is envisaged that the housing has at least two mutually separate chambers, wherein the optical conductor formed in the housing wall connects the two chambers to one another in terms of communication. At least one partition, for example, is formed in the housing, thus enabling at least two mutually separate chambers to be formed in the housing. In this way, it is possible, for example, to arrange a battery cell pack in the first chamber, and to arrange the battery electronics system in the second chamber. Here, the optical conductor is formed in the housing wall in such a way that the two chambers are connected via the optical conductor. A simple and inexpensive data and/or signal transmission section is thus formed between the two chambers.

One advantageous development of the invention consists in that the chambers are formed in such a way as to be separated from one another in a manner impermeable to gas and/or liquid, wherein the at least one battery cell pack is arranged in the first chamber, and the battery electronics system is arranged in the second chamber.

Separation of the chambers in a manner which is impermeable to gas and/or liquid is accomplished by attaching the partition to the housing wall in a fluidtight manner, for example. The fluidtight attachment of the partition is accomplished by welding and/or adhesive bonding, for example. It is likewise conceivable for the partition to be formed integrally with the housing wall, and to be produced in a single production process with the housing wall. Thus, two chambers separated from one another in a fluidtight manner may be connected to one another in terms of communication via the optical conductor formed and/or arranged in the housing wall.

The invention furthermore relates to the use of the battery according to the invention in a motor vehicle, such as in a motor vehicle which is operated at least partially or fully electrically. The motor vehicle may thus preferably be a hybrid vehicle (HEV), plug-in hybrid vehicle (PHEV) or an electric vehicle (EV).

Moreover, the invention relates to a method for producing the housing according to the invention, comprising the steps of:
- producing and/or providing the housing, wherein the housing has at least one housing wall that is formed from a plastic;
- selectively heating the housing wall comprising the plastic, wherein the refractive index in the plastic is modified by the heating, with the result that an optical conductor is formed.

In other words, one aspect of the invention is that a housing having at least one housing wall is provided and/or produced. The housing wall is formed at least partially from a plastic. In this case, production is performed by an injection molding method. By selective heating of the plastic in the housing wall, the refractive index in the plastic is modified, thereby forming an optical conductor. The selective heating of the plastic may be performed by a thermal method, such as a laser, and very particularly preferably with a pulsed laser. In this way, there is the preferred possibility of transferring data and/or signals, especially physical data and/or signals, via the optical conductor formed in the housing wall. Thus, a housing is formed with a data transmission section in a simple and inexpensive manner, while the installation space and the weight of the housing is furthermore reduced.

Finally, the invention relates to a method for producing the battery according to the invention, comprising the steps of:
- producing and/or providing the housing, wherein the housing has at least one housing wall that is formed from a plastic;
- selectively heating the housing wall comprising the plastic, wherein the refractive index in the plastic is modified by the heating, with the result that an optical conductor is formed;
- inserting and/or arranging at least one battery cell pack, which has an optical interface, and at least one battery electronics system, which has an optical interface, wherein the respective optical interface is connected to the optical conductor in terms of communication.

Further features and advantages of the present invention will emerge from the subclaims and the following exemplary embodiment. The exemplary embodiment is to be understood not as restrictive, but rather as an example. It is intended to enable a person skilled in the art to carry out the invention. The applicant reserves the right to make one or more of the features disclosed in the exemplary embodiment the subject of patent claims or to include such features in existing patent claims.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The exemplary embodiment will be discussed in more detail on the basis of a drawing. In the drawing:

FIG. 1 shows a section through a battery in accordance with the preferred exemplary embodiment of the invention.

DETAILED DESCRIPTION OF THE PREFERRED EMBODIMENTS

The following description of the preferred embodiment(s) is merely exemplary in nature and is in no way intended to limit the invention, its application, or uses.

FIG. 1 shows a battery 10, which has a plurality of battery cell packs 14, which are arranged adjacent to one another in a housing 12, and a battery electronics system 16, such as a battery management system BMS, which is arranged in the housing 12. The battery cell packs 14 and the battery electronics system 16 are completely surrounded by the housing 12.

The housing 12 has at least one housing wall 18, which is formed at least partially from a plastic and/or at least partially includes a plastic. In principle, it is conceivable for the housing wall 18 to be formed completely from a plastic and/or for the entire housing 12 to be produced from a plastic. An optical conductor 20 is formed in that region of the housing wall 18 which includes the plastic. The optical conductor 20 is preferably formed by a thermal method, and by retrospective selective heating of the plastic. The selective heating of the plastic is accomplished by a laser, for example. The optical conductor 20 is formed on an inner side 22 of the housing wall 18.

Each of the battery cell packs 14 has battery cell pack electronics 24 with an optical interface 26. The battery cell packs 14 are arranged in the housing 12 in such a way that the optical interface 26 of the battery cell packs 14 is connected and/or coupled to the optical conductor 20 in terms of communication.

The battery electronics system 16 likewise has an optical interface 26, which is connected and/or coupled to the optical conductor 20 in terms of communication.

Thus, the battery electronics system 16 and the battery cell packs 14 are connected in terms of communication via the optical conductor 20 formed in the housing wall 18. In this way, there is the preferred possibility of transferring data and/or signals, especially physical data and/or signals, via the optical conductor 20 formed in the housing wall 18. The physical data and/or signals may contain information on the temperature of the battery cell packs 14 and/or on the state of charge thereof. However, there is no restriction thereto, and it is therefore also possible, in principle, for other information to be transferred. The housing wall 18 or at least the partial region of the housing wall 18 which has the optical conductor 20 may thus be used as a data transmission section. It is thus possible to avoid additional wired cabling between the battery cell packs 14 and the battery electronics system 16, thereby making it possible to reduce production costs for the battery 10, the weight of the battery 10 and/or the installation space requirement for the battery 10 in order to accommodate the cabling.

The housing 12 furthermore has two chambers, namely a first chamber 28 and a second chamber 30, wherein the two chambers 28, 30 are separated from one another by a partition 32. The battery cell packs 14 are arranged in the first chamber 28, and the battery electronics system 16 is situated in the second chamber 30. The optical conductor 20 is arranged in a continuous manner on the inner side 22 of the housing wall 18, such that it connects the two chambers 28, 30 to one another in terms of communication. In this way, it is possible to provide a simple communications link between the chambers 28, 30. The partition 32 may be formed integrally with the housing wall 18, with the result that the chambers 28, 30 are preferably formed in such a way as to be separated fluid-tightly from one another.

REFERENCE SIGNS

10 Battery
12 Housing/Battery housing
14 Battery cell pack
16 Battery electronics system
18 Housing wall
20 Optical conductor/Optical waveguide
22 Inner side
24 Battery cell pack electronics
26 Optical interface
28 First chamber
30 Second chamber
32 Partition

What is claimed is:

1. A housing for receiving at least one battery cell pack, comprising:
    at least one housing wall, wherein the housing wall is formed at least partially from a plastic, and
    an optical conductor formed in the plastic of the housing wall by selectively heating the at least one housing wall such that the refractive index in the plastic is modified, forming the optical conductor.

2. The housing of claim 1, the housing wall further comprising at least one fastening device for fastening at least one battery cell pack.

3. The housing of claim 2, the fastening device further comprising a clamping device.

4. The housing of claim 2, the fastening device further comprising a screw-action device.

5. The housing of claim 1, further comprising at least two mutually separate chambers, wherein the optical conductor formed in the housing wall provides communication between the at least two mutually separate chambers.

6. The housing of claim 5, wherein the at least two mutually separate chambers are formed in such a way as to be separated from one another in a manner impermeable to at least one of a gas or a liquid.

7. A battery, comprising:
    a plurality of optical interfaces;
    at least one battery cell pack having one of the plurality of optical interfaces;
    a battery electronics system having another of the plurality of optical interfaces;
    a housing, which surrounds the at least one battery cell pack and the battery electronics system;
    at least one housing wall being part of the housing, the at least one housing wall formed at least partially from a plastic; and
    an optical conductor formed in the plastic by selectively heating the at least one housing wall such that the refractive index in the plastic is modified, forming the optical conductor;
    wherein the at least one battery cell pack and the battery electronics system are arranged in the housing such that each of the plurality of optical interfaces is in communication with the optical conductor formed in the housing wall.

8. The battery of claim 7, the housing wall further comprising:
    at least one fastening device for fastening one of the at least one battery cell pack or the battery electronics system; and
    fastening means being part of the battery cell pack or the battery electronics system;
    wherein the at least one fastening device is configured with the fastening means.

9. The battery of claim 8, the fastening device further comprising a clamping device and the fastening means further comprising a device for latching in behind, and the device for latching in behind is brought into engagement with the clamping device.

10. The battery of claim 8, the fastening device further comprising a screw-action device and the fastening means is a screw element, and the screw element is brought into engagement with the screw-action device.

11. The battery of claim 7, the housing further comprising at least two mutually separate chambers, wherein the optical conductor formed in the housing wall provides a communication link between the at least two mutually separate chambers.

12. The battery of claim 11, wherein the chambers are formed in such a way as to be separated from one another in a manner impermeable to at least one of a gas or a liquid.

13. The battery of claim 11, wherein the at least one battery cell pack is arranged in the first chamber, and the battery electronics system is arranged in the second chamber.

14. The battery of claim 7, wherein the battery is for use in a motor vehicle.

15. The battery of claim 14, the motor vehicle further comprising a motor vehicle which is operated at least partially or fully electrically.

16. A method for producing a housing, comprising the steps of:
    providing a housing;
    providing an optical conductor;
    providing at least one housing wall being part of the housing;
    providing a plastic;
    forming the at least one housing wall from the plastic;
    selectively heating the at least one housing wall such that the refractive index in the plastic is modified, forming the optical conductor.

17. A method for producing a battery, comprising the steps of:
    providing a housing;
    providing at least one housing wall being part of the housing;
    providing a plastic;
    providing at least one battery cell pack;
    providing at least one battery electronics system;
    providing a plurality of optical interfaces, one of the plurality of optical interfaces being part of the at least one battery cell pack, and another one of the plurality of optical interfaces being part of the at least one battery electronics system;
    forming the at least one housing wall from the plastic;
    selectively heating the at least one housing wall, wherein the refractive index in the plastic is modified by the heating, with the result that an optical conductor is formed;
    inserting at least one battery cell pack and at least one battery electronics system into the housing such that each of the plurality of optical interfaces is in communication with the optical conductor.

\* \* \* \* \*